United States Patent
Park et al.

(10) Patent No.: US 6,309,039 B1
(45) Date of Patent: Oct. 30, 2001

(54) CONTAINER WITH BOTTOM PANEL AND METHOD OF MAKING SAME

(75) Inventors: Sung Won Park, Downsview (CA); Sung Jun Kang, Seoul (KR)

(73) Assignee: GH Canada Inc., Ontario (CA)

( * ) Notice: Subject to any disclaimer, the term of this patent is extended or adjusted under 35 U.S.C. 154(b) by 0 days.

(21) Appl. No.: 09/512,036

(22) Filed: Feb. 24, 2000

(51) Int. Cl.[7] .................................................. A47B 43/00
(52) U.S. Cl. .......................... 312/258; 312/348.1; 229/931
(58) Field of Search ............................ 312/330.1, 348.1, 312/348.2, 258, 259, 260; 217/12 R, 13, 12 A, 16; 229/909, 913, 931, 124, 182

(56) References Cited

U.S. PATENT DOCUMENTS

| | | | |
|---|---|---|---|
| 336,433 | 2/1886 | Powers | 229/909 X |
| 348,928 | 9/1886 | Powers . | |
| 1,400,084 | 12/1921 | Leiman | 229/909 X |
| 1,627,811 | 5/1927 | Smith | 493/110 X |
| 1,752,601 | 4/1930 | Leiman | 229/909 X |
| 1,865,159 | 6/1932 | Adamson | 229/909 X |
| 2,011,046 * | 8/1935 | Fredricksen | 217/12 A |
| 2,026,698 * | 1/1936 | Nelson | 229/931 X |
| 2,160,221 | 5/1939 | Masters et al. . | |
| 2,719,808 | 10/1955 | Elmendorf . | |
| 3,315,834 * | 4/1967 | Nemlich | 312/330.1 X |
| 3,472,571 * | 10/1969 | Himelreich | 312/259 |
| 3,612,639 * | 10/1971 | Williams | 312/310 |
| 3,654,053 | 4/1972 | Toedter . | |
| 3,826,554 * | 7/1974 | Cornell | 312/348.1 |
| 3,913,822 | 10/1975 | Heaps, Jr. . | |
| 3,933,401 * | 1/1976 | Lampe et al. | 312/348.1 |
| 4,090,903 | 5/1978 | Matsui . | |
| 4,116,513 * | 9/1978 | Ullman, Jr. | 312/348.2 |
| 4,969,380 | 11/1990 | Halligan . | |
| 5,211,618 | 5/1993 | Stoltz . | |
| 5,302,227 | 4/1994 | Dalrymple et al. | 156/443 |
| 5,322,181 | 6/1994 | Nelson | 220/461 |
| 5,337,916 | 8/1994 | Voss | 220/418 |
| 5,427,309 | 6/1995 | Voss | 229/182 |
| 5,927,841 * | 7/1999 | Ferrari et al. | 312/330.1 X |

* cited by examiner

Primary Examiner—Peter M. Cuomo
Assistant Examiner—James O. Hansen
(74) Attorney, Agent, or Firm—Fulbright & Jaworski, LLP

(57) ABSTRACT

A container formed from a length of a laminated elongate board having a slot formed along a sufficient length of the board for receiving the edges of a bottom panel. A series of widthwise V-groove cuts are made on the elongate board to form a plurality of folding sections that are continuously joined by the laminate. The slot in the board receives the edges of the bottom panel when the folding sections are folded at the V-grooves to enclose the bottom panel.

9 Claims, 2 Drawing Sheets

CONTAINER WITH BOTTOM PANEL AND METHOD OF MAKING SAME

FIELD OF THE INVENTION

This invention relates to a container with a bottom panel and a method for making the same.

BACKGROUND OF THE INVENTION

Mass production of high quality wooden storage containers having consistent, attractive wood grain patterns can be prohibitively expensive due to raw material costs, the random pattern of wood grains which need to be matched in forming the container, and expensive treatments necessary to make the wood surface smooth and sliver-free. Wooden containers may also crack, twist, or change their shapes when exposed to moisture and heat. Furthermore, fine printing with colors on finished wood surfaces may be difficult to achieve.

The use of flexible laminates having a wood grain pattern, or other decorative pattern, adhesively secured to a relatively inexpensive board material to give the appearance of wood is known in the prior art. Also, the problem of forming bends or corners in material of substantial thickness is known. The use of right-angled V-grooved cuts has been proposed to form right-angled corners for a box. For example, U.S. Pat. No. 1,865,159 discloses the use of right-angled V-grooves cut into a flat board material to facilitate bending of the board material to form sharp corners.

While various methods of making simple containers using laminated flat board materials are known, a new way to simplify the steps required for forming a secure container bottom is desirable.

SUMMARY OF THE INVENTION

Accordingly, it is an object of the present invention to provide a method of making a container which is relatively inexpensive, visually attractive, of high strength, and provides a locking container bottom panel.

In one aspect, the present invention provides a method of forming a container, comprising the steps of:

(a) providing a board for forming the walls of said container, said board having a top edge, a bottom edge, an outer surface, and an inner surface, at least said outer surface having a sheet of flexible laminate attached thereon;

(b) cutting a slot along a sufficient length of said inner surface to provide support for a container bottom panel, said slot being substantially parallel to the bottom edge of the board;

(c) cutting at least two V-grooves to span between the top edge and the bottom edge of the board so as to form two terminal folding sections and at least one intermediate folding section, each of said terminal folding sections being joined to an adjacent intermediate folding section by said flexible laminate along one edge thereof and each having an outer edge opposite said one edge thereof and each of said at least one intermediate folding section being joined to two adjacent folding sections by said flexible laminate;

(d) providing a container bottom panel having an edge thickness which fits into said slot formed in step (b) and having a polygonal shape with side dimensions corresponding substantially to the lengths of the folding sections formed in said board;

(e) folding said folding sections along said V-grooves so as to collapse said V-grooves, said folding sections forming a corner of the container wall at each collapsed V-groove; and (f) joining said outer edge surfaces of said outer sections so as to form another corner of the container wall.

In another aspect, the present invention provides a container formed from parts, comprising:

(a) a board having a top edge, a bottom edge, an outer container surface, and an inner container surface, at least said outer surface having a sheet of flexible laminate attached thereon; said board having a slot formed along a sufficient length of the inner surface to provide support for a bottom panel, said slot being substantially parallel to the bottom edge of the board; and at least two V-grooves spanning between the top edge and the bottom edge of the board so as to form two terminal folding sections and at least one intermediate folding section from said board, each of said terminal folding sections being joined to an adjacent intermediate folding section by said flexible laminate along one edge thereof and each having an outer edge opposite said one edge thereof and each of said at least one intermediate folding section being joined to two adjacent folding sections by said flexible laminate; and (b) a container bottom panel having an edge thickness which fits into said slot and having a polygonal shape with side dimensions corresponding substantially to the lengths of the folding sections formed in said board.

BRIEF DESCRIPTION OF THE DRAWINGS

For a better understanding of the present invention, and to show more clearly how it may be carried into effect, reference will be made by way of example to the accompanying drawings which show a preferred embodiment of the present invention, and in which.

DETAILED DESCRIPTION OF THE INVENTION

Figure 1:
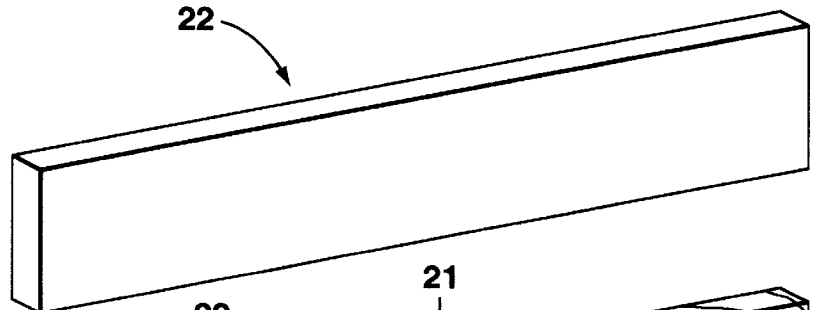
FIG. 1 shows a perspective view of a length of an elongate flat board.

Referring to FIG. 1, a length of an elongate flat board 22 is shown. The flat board 22 has a top edge, a bottom edge, an outer flat surface (hidden from view), and an inner flat surface facing the viewer of FIG. 1. The flat board 22 may be formed from any number of suitable materials including, but not limited to, light-weight, heavy-gauge cardboard made from highly compressed recycled paper. Alternatively, to obtain a suitable thickness, the flat board 22 may be formed from a compressed foam, plastic, or medium density fiberboard (MDF) material which is sufficiently strong and sufficiently dense for cutting, and for receiving slots on one of its sides or edges.

Figure 2:
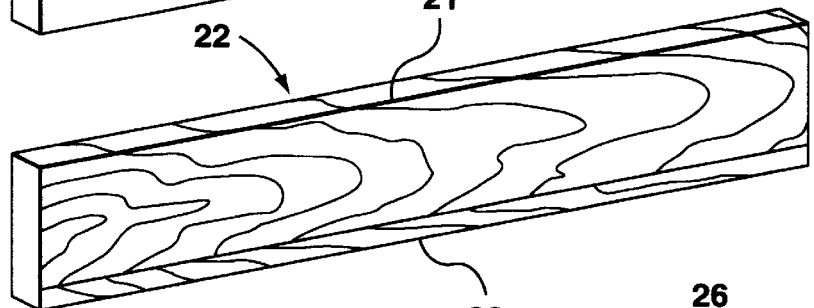
FIG. 2 shows a perspective view of the length of the elongate board of FIG. 1 with a flexible laminate adhesively secured to all sides of the board, with the exception of either end of the board.

Now referring to FIG. 2, the length of elongate flat board material 22 of FIG. 1 is shown with a sheet of laminate 21 which is adhesively secured to the sides and top and bottom edges of the board 22. (While the sheet of laminate 21 is shown to be attached to the top and bottom edges and the sides of the board 22 for the sake of appearance, as will be explained below, only the outer flat surface must have a sheet of laminate 21 attached to it.) The laminate 21 may be formed from a variety of materials including paper, cloth, leather, plastic, vinyl or any other suitable material on which a decorative pattern can be applied and which is sufficiently flexible and bendable to form corners. As shown in FIG. 2, a seam 23 is formed by two adjoining edges of the laminate 21 which covers the flat board 22.

Figure 3:
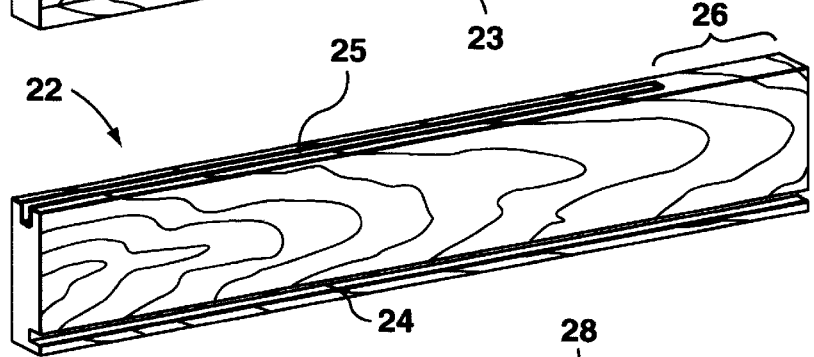
FIG. 3 shows a perspective view of the laminated, elongate board of FIG. 2 having a slot running along the length of one side of the board near the bottom edge of the board, and another slot formed along the top edge of the board for a substantial length of the board.

Now referring to FIG. 3, a horizontal slot 24 is formed along the entire length of one side of the board 22, and near the bottom edge of the board 22. The slot may be cut by a routing operation or any similar cutting operation. Alternatively, if the board 22 is made by compression in a mold, the slot may be pre-formed. It will be noted that the slot 24 is formed to coincide with the seam 23 so that the seam 23 is no longer visible once the cut is made.

FIG. 3 also shows a vertical slot 25 cut into the top edge of the board 22 and running along a substantial length of the top edge of the board 22. At one end of the board 22 a short length of the top edge of the board 22 is not slotted and the length of this uncut portion 26 is determined by the length of one terminal folding section of a container wall as described below.

Figure 4:
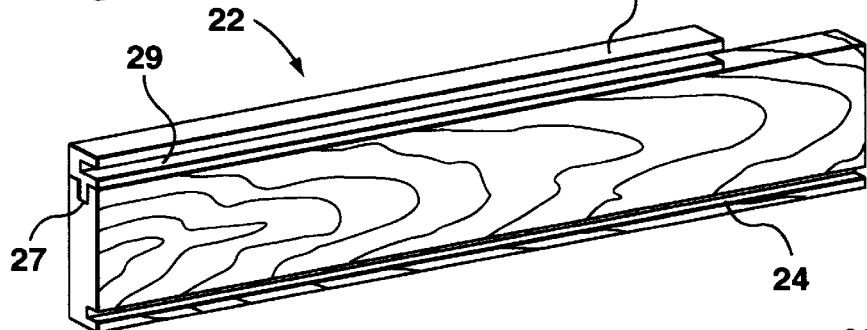
FIG. 4 shows a perspective view of the slotted board of FIG. 3 with a length of an extrusion fitted into the top slot in the board of FIG. 3.

Now referring to FIG. 4, the slotted board 22 of FIG. 3 is shown with a length of extrusion 28 which has been fitted into the slot 25 running along the top edge of the flat board 22 by means of a fin 27 on the underside of the extrusion 28 which matches the slot 25. The length of the fin 27 may be secured in position in the slot 25 by the use of a suitable adhesive. Typically, the length of extrusion 28 is formed from a plastic material, but it may also be formed from any type of material which is capable of being extruded, including metals such as aluminum.

Still referring to FIG. 4, in addition to the fin 27, the length of extrusion 28 also forms a horizontal extrusion slot 29 for receiving the edges of a container lid, as described further below.

Figure 5:
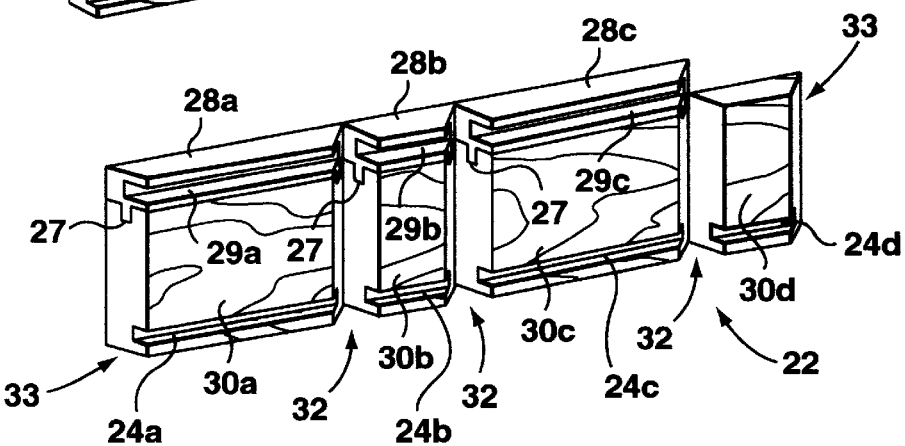
FIG. 5 shows a perspective view of the slotted board of FIG. 4 with a series of widthwise V-groove cuts along its length and angled cuts at either end to facilitate folding.

Now referring to FIG. 5, the length of the laminated board 22 with the extrusion 28 attached to the top edge of the board 22 is now shown with a series of widthwise cuts 32, 33 at various points along the length of the board 22. In order to form these cuts 32, 33, first, small portions of either end of the board 22 are cut at a 45° angle from a plane normal to the board 22 to form end surfaces cut at 45°. The remaining length of the board 22 is cut into four folding sections 30a–30d by the use of three V-grooves 32, each side wall of the V-grooves 32 being cut at 45° from a plane which is normal to the board 22 to form a 90° angle between the side wall of the V-grooves 32. The four folding sections 30a–30d comprise two terminal folding sections (30a, 30d) and two intermediate folding sections (30b, 30c). The V-grooves 32 are cut carefully so as to extend through substantially the full thickness of the board 22, and more particularly not to extend through the laminate 21 on the outer flat surface of the board 22, so that the laminate 21 on the outer flat surface is adhesively and continuously secured to all four folding sections 30a–30d. As shown by way of example in FIG. 5, in order to form the four sides of a rectangular container wall, the lengths of sections 30a and 30c are substantially the same and the lengths of sections 30b and 30d are substantially the same. Of course, to form a square-shaped container wall, all four folding sections 30a–30d would be the same length. Corresponding to the four sections 30a–30d, the slot 24 formed into one side and near the bottom of the board 22 in FIG. 3 now forms four lengths of slots 24a–24d. Similarly, the length of extrusion 28 has been cut to form three folding extrusion sections 28a–28c. There is no corresponding length of extrusion for the top of section 30d and this corresponds to the unslotted portion 26 of the top edge of board 22 discussed above in reference to FIG. 3.

Figure 6:
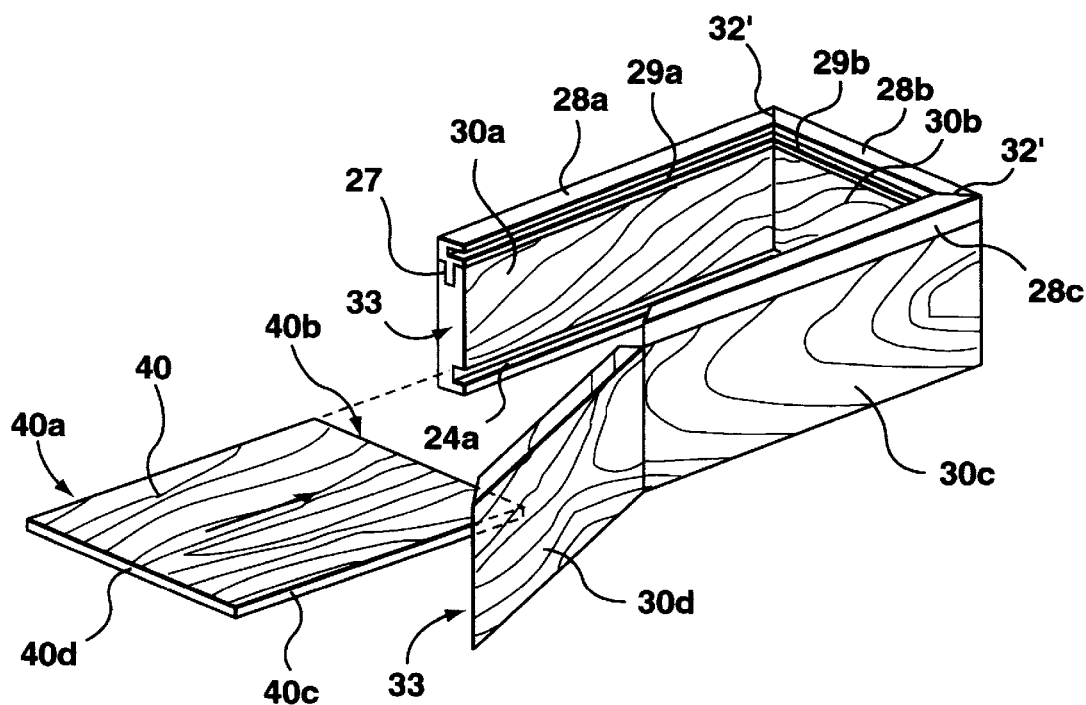
FIG. 6 shows a perspective view of the cut, slotted board of FIG. 5 folded along two of the V-grooves and ready to slidably receive a container bottom panel which will be locked in position.

Now referring to FIG. 6, the board 22 cut and formed in FIG. 5 has now been folded along two of the V-grooves to form three sides 30a–30c of a container wall. A bottom panel 40 is aligned with the slots 24a, 24b (hidden from view), 24c (hidden from view) so that the bottom panel 40 can be slidably inserted into the slots 24a–24c. The bottom panel 40 is suitably sized (as to thickness and overall length and width dimensions) so that its edges 40a–40c fit neatly within the three slots 24a–24c. It will be seen that, when the forth section 30d is finally folded into position so that the outer cut edges 33 are joined together, edge 40d of the bottom panel 40 will also be inserted into the forth slot 24d (hidden from view) and be locked in position. The outer edges 33 may be secured by the use of a suitable adhesive. Similarly, the folded V-grooves 32' may be secured together by the use of a suitable adhesive. Optionally, a suitable adhesive may be used to further secure the bottom panel 40 within the slots 24a–24d, but it will be seen that the panel 40 would be locked in position even without the use of an adhesive.

Figure 7:
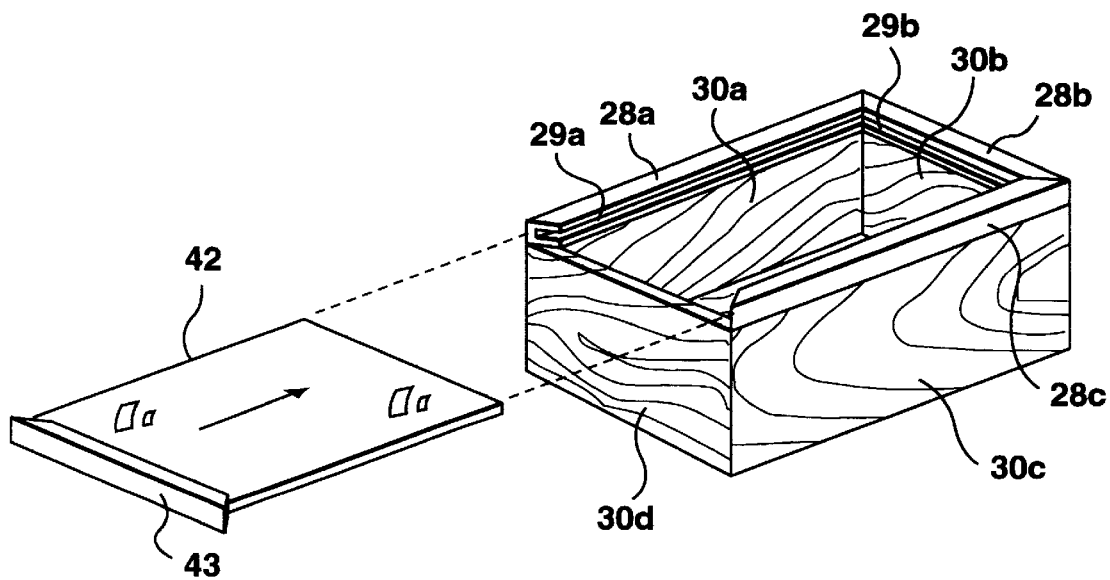
FIG. 7 shows a perspective view of the container formed in FIG. 6, further having horizontal slots in the lengths of extrusion for slidably receiving a container lid.

Finally, in FIG. 7, a slidable container lid 42 is aligned with the horizontal extrusion slots 29a, 29b, and 29c (hidden from view). Again, the lid 42 is suitably sized (as to thickness and to overall dimensions) to fit neatly within the horizontal extrusion slots 29a–29c. Along one edge of the slidable lid 42 is a second length of extrusion 43 which substantially matches the cross-section of the other lengths of extrusion 28a, 28b, 28c, except that the second length of extrusion 43 does not have a bottom fin 27 common to the other lengths of extrusion 28a–28c. When the slidable lid 42 is fully inserted, either end of the second length of extrusion 43 abuts the ends of the lengths of extrusion 28a and 28c. The slidable lid 42 may be made from transparent or translucent materials so that the contents of the fully formed container may be viewed with the lid 42 in position.

While the invention has been particularly shown and described with reference to certain embodiments, it will be understood by those skilled in the art that various other changes in form and detail may be made without departing from the spirit and scope of the invention.

While the formation of a four-sided reinforced container has been shown and described, it will be appreciated that the application of the reinforcing container wall and method of the present invention may be extended to containers having more than or less than four sides. If an angle other than 90° is to be formed between two sections of the cut board 40, the cutting angles to cut the side walls of the V-grooves 32 must be altered accordingly. Generally speaking, the sides of a V-groove are cut at an angle C from a plane normal to a board, and bisecting the V-groove, based on the formula C=(180°−A) divided by 2 where A is the desired angle between two adjacent folding sections.

If a slidable container lid is to be used, then at least two of the receiving sides of the container should be parallel to accommodate the lid. This may mean that the length of extrusion 28 may extend over only a few of the folding sections depending on the polygonal shape of the container. To compensate, the slidable container lid 42 which is formed to match the polygonal shape of the container may have more than one finless length of extrusion on more than one edge of the container lid 42.

What is claimed is:

1. A method of forming a container, comprising the steps of:
   (a) providing a board for forming a wall of said container, said board having a top edge, a bottom edge, an outer surface, and an inner surface, at least said outer surface having a sheet of flexible laminate attached thereon;
   (b) cutting a slot along a sufficient length of said inner surface to provide support for a container bottom panel, said slot being substantially parallel to the bottom edge of the board;
   (c) attaching a length of extrusion along the top edge of the board, said length of extrusion providing a second slot for receiving an edge of slidable container lid;
   (d) cutting at least three V-grooves to span between the extrusion and the bottom edge of the board so as to form two terminal folding sections and at least one intermediate folding section, each of said terminal folding sections being joined to an adjacent intermediate folding section by said flexible laminate along one edge thereof and each having an outer edge opposite said one edge thereof and each of said at least one intermediate folding section being joined to two adjacent folding sections by said flexible laminate;
   (e) providing a container bottom panel having an edge thickness which fits into said slot formed in step (b) and having a polygonal shape with side dimensions corresponding substantially to the lengths of the folding sections formed in said board;
   (f) folding said folding sections along said V-grooves so as to collapse said V-grooves, said folding sections forming a corner of the wall of said container at each collapsed V-groove; and
   (g) joining said outer edges of said terminal sections so as to form another corner of the wall of said container.

2. The method claimed in claim 1, wherein each of said V-grooves comprises side walls defining a valley extending down to a valley bottom and, wherein, both side walls of the valley are generally planar and are cut at an angle C as measured from a plane normal to the board and bisecting said V-groove, angle C being defined for each V-groove by the equation (180°−A)/2, where A is a desired angle to be formed between two folding sections adjacent said V-groove.

3. The method claimed in claim 1, wherein said length of extrusion extends along the top edge of at least two folding sections formed in step d.

4. The method claimed in claim 3 wherein, said length of extrusion is secured to the top edge of the board by means of a fin running along the bottom of said length of extrusion, said fin being inserted into a third slot formed into the top edge of said board.

5. A container formed from parts, comprising:
   (a) a board having a top edge, a bottom edge, an outer container surface, and an inner container surface, at least said outer surface having a sheet of flexible laminate attached therein; said board having a slot formed along a sufficient length of the inner surface to provide support for a bottom panel, said slot being substantially parallel to the bottom edge of the board; said board also having a length of extrusion attached to the top edge, the length of extrusion having a second slot for receiving an edge of a slidable container lid; and said board also having at least three V-grooves spannig between the extrusion and the bottom edge of the board so as to form two terminal folding sections and at least one intermediate folding section from said board, each of said terminal folding sections being joined to an adjacent intermediate folding section by said flexible laminate along one edge thereof and each having an outer edge opposite and one edge thereof and each of said at least one intermediate folding section being joined to two adjacent folding sections by said flexible laminate; and
   (b) a container bottom panel having an edge thickness which fits into said slot and having a polygonal shape with side dimensions corresponding substantially to the lengths of the folding section formed in said board.

6. The container claimed in claim 5, wherein each of said V-grooves comprises side walls defining a valley extending down to a valley bottom and, wherein, both side walls of the valley are generally planar and are cut at an angle C as measured from a plane normal to the board and bisecting said V-groove, angle C being defined for each V-groove by the equation (180°−A)/2, where A is desired angle to be formed between two folding sections adjacent said V-groove.

7. The container claimed in claim 5, wherein said length of extrusion is attached along the top edge of at least two of said folding sections.

8. The container claimed in claim 5, wherein, said length of extrusion has a fin running along the bottom of said length of extrusion and, wherein, the board includes a third slot running along the top edge of the board for receiving said fin.

9. The container claimed in claim 5, wherein, said board is formed from medium density fiberboard.

* * * * *